UNITED STATES PATENT OFFICE.

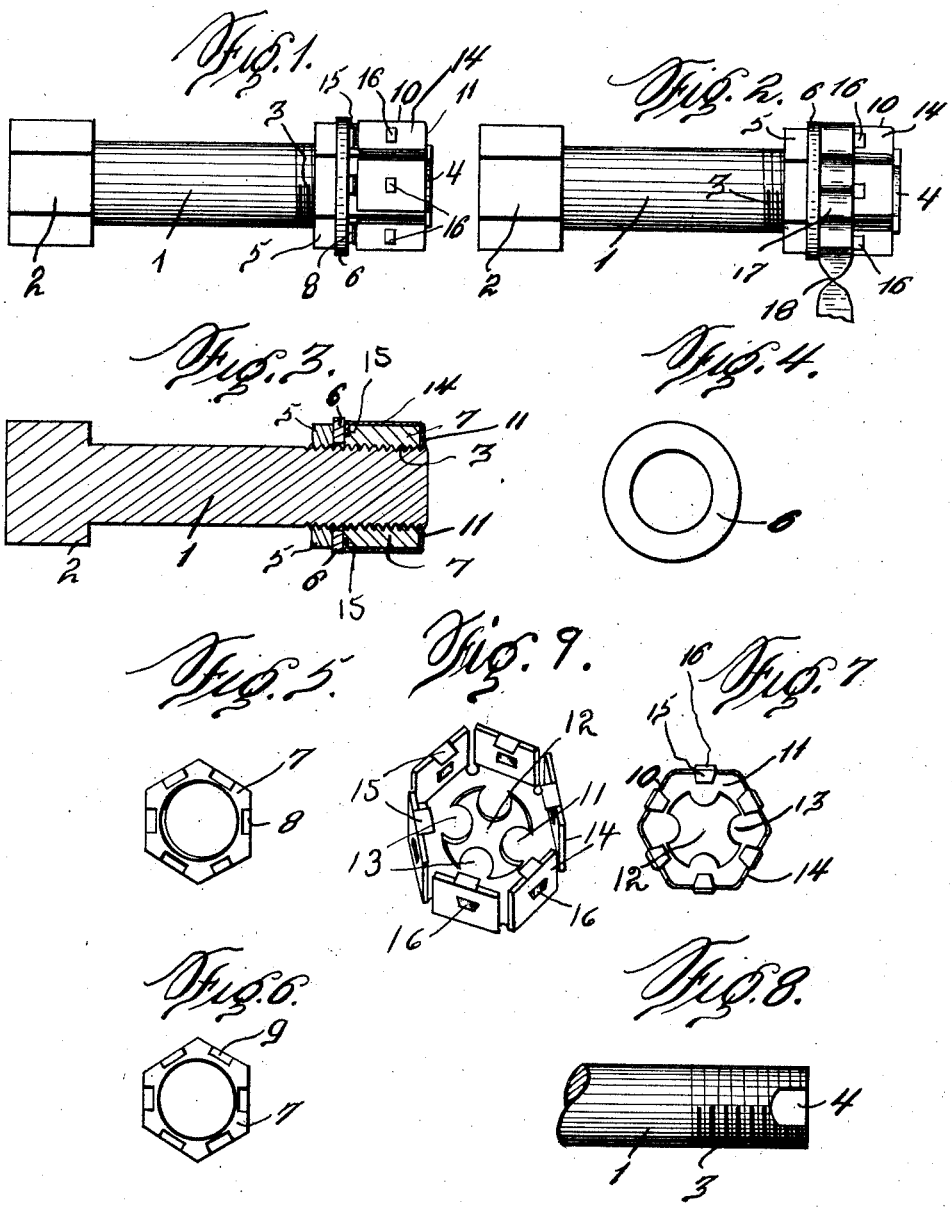

BENJAMIN HOUGHTON, OF MINGO JUNCTION, OHIO.

NUT-LOCK.

998,514. Specification of Letters Patent. Patented July 18, 1911.

Application filed January 29, 1910. Serial No. 540,789.

*To all whom it may concern:*

Be it known that I, BENJAMIN HOUGHTON, a citizen of the United States, residing at Mingo Junction, in the county of Jefferson and State of Ohio, have invented certain new and useful Improvements in Nut-Locks, of which the following is a specification.

This invention relates to nut locks and has for its object to provide in a manner as hereinafter set forth and claimed positive and reliable means for locking a nut upon a bolt to prevent the nut from becoming accidentally displaced and to further provide a nut lock that can be easily and quickly placed in position as well as one that can be advantageously used in connection with rail joints, bridges, rolling stock and other structures subjected to vibration.

The invention further aims to provide a nut lock which shall be comparatively simple in its construction and arrangement, strong, durable, efficient in its use, readily set up in locking position, and comparatively inexpensive to manufacture.

With the foregoing and other objects in view, the invention consists of the novel construction, combination and arrangement of parts as hereinafter more specifically described and illustrated in the accompanying drawings which form a part of this specification and in which is illustrated an embodiment of the invention, but it is to be understood that changes, variations and modifications can be resorted to which come within the scope of the invention claimed.

In the drawings wherein like reference characters denote corresponding parts throughout the several views: Figure 1 is a side elevation of a nut lock in accordance with this invention. Fig. 2 is a like view of a modified form. Fig. 3 is a longitudinal sectional view of the form shown in Fig. 1. Fig. 4 is an elevation of the washer forming an element of the nut lock. Fig. 5 is a rear elevation of the locking nut. Fig. 6 is a front elevation thereof. Fig. 7 is a rear elevation of the locking member. Fig. 8 is a plan of a portion of a bolt constructed in accordance with this invention. Fig. 9 is a perspective view of the locking member.

Referring to the drawings, 1 denotes a bolt provided at one end with a head 2 and having its other end threaded as at 3. The threaded end 3 of the bolt is cut-away to provide diametrically opposed seats 4 for a purpose to be presently referred to. Mounted upon the threaded end 3 of the bolt 1 is an auxiliary nut 5 and engaging one side of said nut 5 is a washer 6. To retain the washer 6 in engagement with the auxiliary nut 5 is a locking nut 7 which is mounted upon the screw-threaded end 3 of the bolt 1. The outer face of the locking nut at its inner end is cut-away to provide a series of recesses 8, a recess being provided for each side of the nut and when forming said recesses portions of the inner or rear face of the locking nut are cut-away. The locking nut 7 upon its outer face at its outer or forward end is cut-away to provide a series of grooves 9, the grooves being in alinement with respect to the recesses.

To prevent the locking nut 7 turning upon the bolt and to prevent the bolt turning with respect to the locking nut 7 a locking member 10 is provided. The locking member 10 is substantially cup-shaped in contour and consists of a body-portion 11 in the form of a disk and which is provided with a centrally-disposed opening 12 having its wall cut-away to provide a series of equally spaced lugs 13 adapted to extend in the seats 4. When the locking member is in operative position, the body-portion 11 has the bolt extending through the opening 12 so that the lugs 13 will engage in the seats 4. The body-portion 11 when the locking member is in position abuts against the forward end of the nut and conforms in contour to the shape of the nut. Formed integral with and projecting from the body-portion is a series of resilient clamping arms 14 which extend approximately at right angles with respect to the body-portion 11 and engage the sides of the nut 7. The number of the clamping arms correspond to the sides of the nut 7 and are adapted to grip the sides of the nut 7. Each arm at its inner end is provided approximately centrally thereof with a lug 15 which lugs are adapted to engage in the recesses 8. Each of the arms 14 is furthermore provided with an outwardly-extending protuberance 16 for a purpose to be presently referred to.

The locking member 10 is adapted to be sprung over the locking nut 7, the lugs 15 passing upwardly in the grooves 9 over the sides of the nut and eventually entering the recesses 8, whereby the locking member is connected to the locking nut.

The lugs 15 prevent the locking member 10 from turning with respect to the nut and the lugs 13 prevent the locking member from turning with respect to the bolt or in other words, the locking member will prevent the nut and bolt from turning with respect to each other.

If the resiliency of the arms 14 is not sufficient to clamp or grip the sides of the nut, a strap or band 17 is placed around the arms between the washer 6 and the protuberances 16, these latter preventing the band from slipping outwardly off the locking member. The ends of the strap or band can be twisted as at 18 or otherwise connected together.

What I claim is:

In a nut lock, a bolt having a threaded end provided with diametrically opposed seats, a locking nut mounted upon the screw-threaded portion of the bolt and having one end provided with a plurality of recesses and its other end with a plurality of grooves, a locking member comprising a body-portion mounted upon the bolt and against said nut and formed with a plurality of lugs engaging in said seats to prevent rotation of the body-portion with respect to the bolt, said locking member further including a plurality of clamping arms projecting substantially at right angles with respect to said body-portion and each having its free end provided with an inwardly-projecting lug engaging in one of said recesses, said inwardly-extending lugs preventing the rotation of the locking member with respect to the nut, said grooves providing clearances for the passage of the inwardly-extending protuberances when mounting the locking member upon the nut, each of said arms provided with an outwardly-extending protuberance, and a strap arranged upon the inner portion of said arms and engaging said protuberances, said strap binding said arms upon the nut and said protuberances arresting the outward movement of said strap.

In testimony whereof I affix my signature in the presence of two witnesses.

BENJAMIN HOUGHTON.

Witnesses:
Roy X. Smith,
W. B. Lisle.